Figure 1:
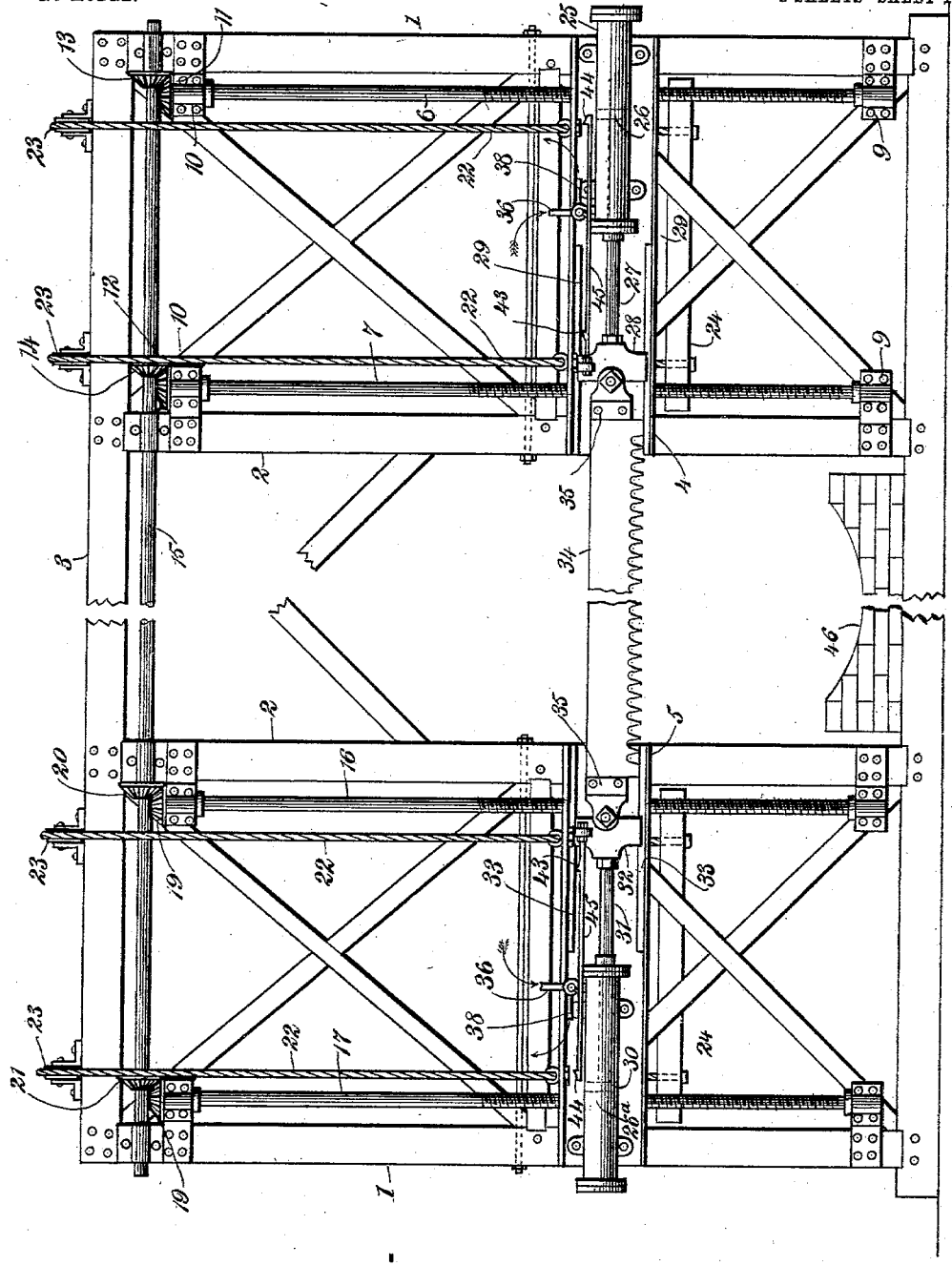

No. 720,944. PATENTED FEB. 17, 1903.
J. MEIKLEJOHN.
SAW OPERATING MECHANISM.
APPLICATION FILED MAY 17, 1902.
NO MODEL. 2 SHEETS—SHEET 1.

WITNESSES:
Charles F. Wilcox
C. R. Ferguson

INVENTOR
James Meiklejohn
BY
ATTORNEYS.

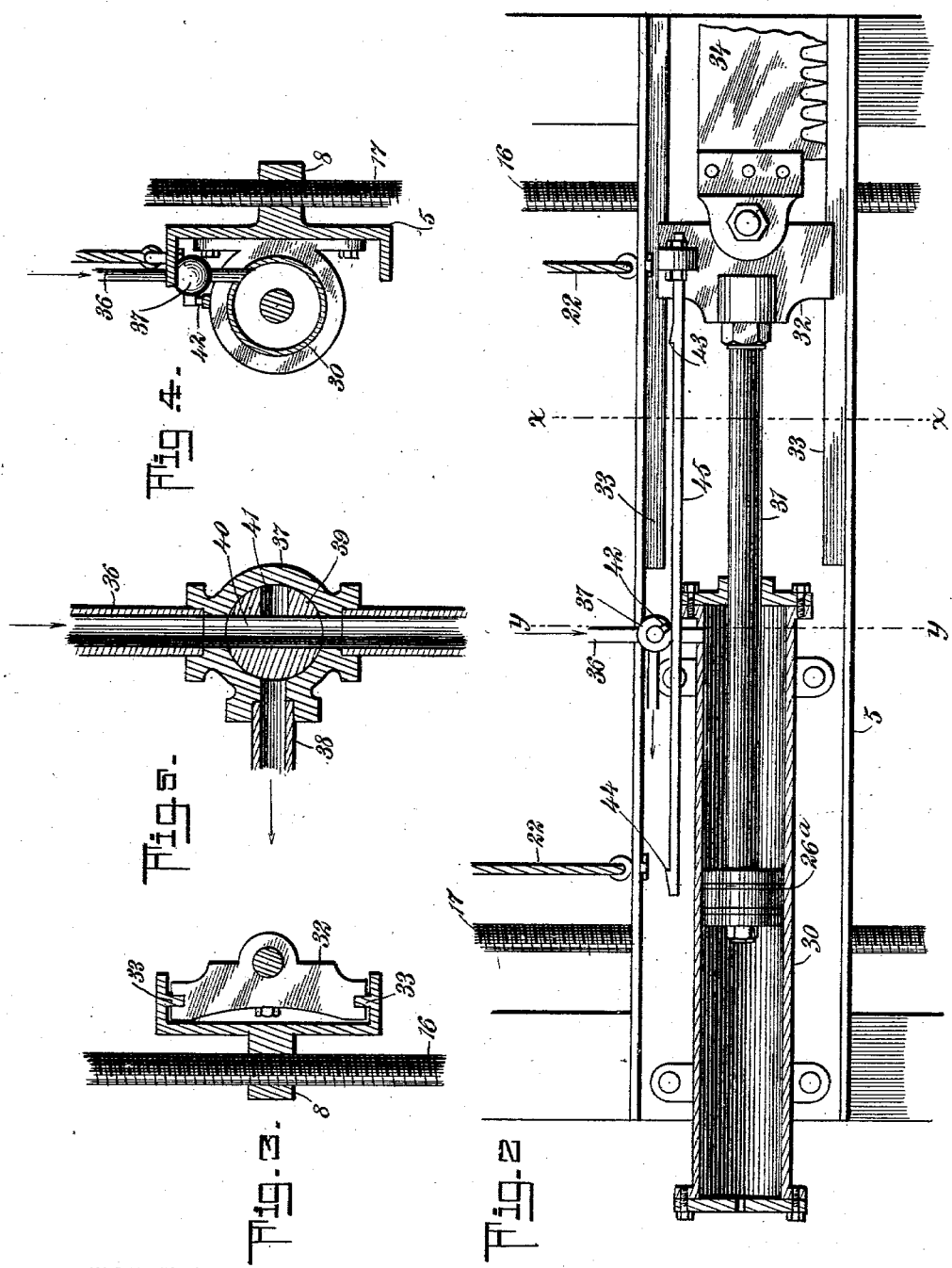

UNITED STATES PATENT OFFICE.

JAMES MEIKLEJOHN, OF SEDRO WOOLLEY, WASHINGTON.

SAW-OPERATING MECHANISM.

SPECIFICATION forming part of Letters Patent No. 720,944, dated February 17, 1903.

Application filed May 17, 1902. Serial No. 107,794. (No model.)

*To all whom it may concern:*

Be it known that I, JAMES MEIKLEJOHN, a citizen of the United States, and a resident of Sedro Woolley, in the county of Skagit and State of Washington, have invented a new and Improved Saw-Operating Mechanism, of which the following is a full, clear, and exact description.

This invention relates to improvements in mechanism for operating crosscut-saws, the object being to provide in connection with a saw steam or other pressure actuated pistons that operate to draw the saw through the work in both directions instead of with a pushing motion, which might cause a buckling or breaking of the saw.

I will describe a saw-operating mechanism embodying my invention and then point out the novel features in the appended claims.

Reference is to be had to the accompanying drawings, forming a part of this specification, in which similar characters of reference indicate corresponding parts in all the figures.

Figure 1 is a front elevation of a saw-operating mechanism embodying my invention. Fig. 2 is a partial section and partial elevation of a part of the actuating mechanism. Fig. 3 is a section on the line $x\,x$ of Fig. 2. Fig. 4 is a section on the line $y\,y$ of Fig. 2, and Fig. 5 is a section through one of the valves employed.

The frame of the machine comprises the outer uprights 1, the inner uprights 2, and the head or top rail 3. Movable vertically along the frame at opposite sides of the uprights 2 are the carriers 4 5, each consisting of metal plates having outwardly-extended flanges at the top and bottom. The carrier 4 is moved by screw-rods 6 7, which engage in tapped openings in lugs 8, extended rearward from the carrier. These screw-rods have bearings 9 at their lower ends and bearings 10 at their upper ends. Attached to the upper ends of the screw-rods 6 and 7, respectively, are bevel gear-pinions 11 12, which engage with bevel-pinions 13 14 on a driving-shaft 15, operated by any suitable source of power. The carrier 5 is also operated by screws 16 17, having bevel-pinions 18 19, engaging with bevel-pinions 20 21 on the shaft 15. These carriers support the saw and the devices for operating the same, and to cause the easy movement of the carriers, or, in other words, to reduce as much as possible the weight sustained by the screws, cables 22 extend from the carriers over pulleys 23 on the top rail 3, and the free ends of these cables are provided with weights 24.

Supported on the carrier 4 is a cylinder 25, in which a piston 26 operates, the stem 27 of the piston connecting with a cross-head 28, movable on guides 29 on the flanges of the carrier. On the carrier 5 is a cylinder 30, in which a piston $26^{a}$ operates, the stem 21 of the piston connecting with a cross-head 32, movable on the guides 33 on the flanges of the carrier. The cross-heads 28 and 32 are connected to the ends of the saw 34 by castings 35. Steam-pipes 36 lead into the cylinders at the inner ends, and arranged in each pipe is a valve-casing 37, from which an exhaust-pipe 38 leads. Operating in each valve-casing is a plug-valve 39, having a main port 40 and an exhaust-port 41. On the stem of each valve is a finger 42, designed to be engaged by either one of the tappets 43 44 on the ends of a shifting rod 45, attached to the cross-head.

In operation the log of wood is to be placed underneath the saw on the support or slide 46 between the uprights 2. The motive agent will be conducted to the pipes 36 by a flexible pipe to permit of the upward and downward movement of the carriers, and assuming the steam to be entering against the piston in the cylinder 30 the valve 39 for the cylinder 30 will be in the position indicated in Fig. 5, but the valve for the other cylinder will be turned one-quarter of a revolution to bring the ports 40 and 41 into position to exhaust through the pipe 38 of the cylinder 25. Upon reaching the end of the motion in this direction the tappet 43, carried by the cross-head 32, will engage with the finger 42, turning the valve of the cylinder 30 to exhaust position, and the tappet 44, carried by the cross-head 28, will move the valve for the cylinder 25 into position to admit the motive agent. Then the reverse action will take place. During the reciprocating movements of the saw it is obvious that the carriers will be moved downward by means of the screw-rods, as before described. Upon sawing through the timber the direction of rotation of the screw-rods is to be reversed to raise the carriers and saw.

Having thus described my invention, I claim as new and desire to secure by Letters Patent—

1. In a saw-operating mechanism, a frame, opposite carriers mounted to move vertically along said frame, each carrier consisting of a plate having outwardly-extended flanges at its upper and lower edges, guides on said flanges, a cylinder mounted on each carrier, cross-heads operated by pistons in the cylinders and movable along said guides, a saw having connection with the cross-heads, and means for operating the carriers.

2. In a saw-operating mechanism, a frame, opposite carriers mounted to move vertically along the said frame, each carrier consisting of a plate having outwardly-extended flanges at its upper and lower edges, guides on said flanges, a cylinder mounted on each carrier, cross-heads operated by pistons in the cylinders and movable along said guides, a saw having connection with the cross-heads, means for operating the carriers, and means for automatically controlling the supply of motive agent for the cylinders.

3. In a saw-operating mechanism, a frame, opposite carriers mounted to move vertically along said frame, each carrier consisting of a metal plate having outwardly-extended flanges at its upper and lower edges, guides on said flanges, a cylinder carried by each carrier, cross-heads having connections with the pistons in the cylinders, the said cross-heads being movable along said guides, a saw having connection with the cross-heads, lugs extended rearward from the carriers and having threaded openings, screw-rods engaging with the threads of said lugs, means for simultaneously operating the screw-rods, and means for automatically controlling the inlet and exhaust of motive agent for the cylinders, substantially as specified.

In testimony whereof I have signed my name to this specification in the presence of two subscribing witnesses.

JAMES MEIKLEJOHN.

Witnesses:
GORDON HOOPES,
M. PARNELL.